United States Patent

Inaga et al.

[15] 3,702,383

[45] Nov. 7, 1972

[54] TAPE LOOP FORMING AND THREADING MECHANISM FOR USE WITH A MAGNETIC RECORDING AND REPRODUCING APPARATUS

[72] Inventors: Katsu Inaga; Yotaro Miura, both of Tokyo, Japan

[73] Assignee: Sony Corporation, Tokyo, Japan

[22] Filed: May 6, 1971

[21] Appl. No.: 140,666

Related U.S. Application Data

[63] Continuation-in-part of Ser. No. 37,694, May 15, 1970.

[52] U.S. Cl.......................179/100.2 T, 179/100.2 Z

[51] Int. Cl.........................G11b 15/66, G11b 23/04

[58] Field of Search.................179/100.2 T, 100.2 Z

[56] References Cited

UNITED STATES PATENTS 3,660,615 5/1972 Kanamaru...........179/100.2 Z 3,512,694 5/1970 Sugaya et al. ........179/100.2 T

*Primary Examiner*—Bernard Konick

*Assistant Examiner*—Robert S. Tupper

*Attorney*—Lewis H. Eslinger et al.

[57] ABSTRACT

In a magnetic recording and/or reproducing apparatus, take-up and supply reels, preferably in a cassette or cartridge and having a tape wound on the reels and extending therebetween, are rotatably mounted on the chassis which also supports rotary magnetic head means movable in a circular path spaced from the reels and coinciding with the periphery of a tape guide drum, and tape guiding fingers are initially disposed close to each other to engage the tape between the reels and, while close to each other, are moved as a group to withdraw tape from the reels in the cassette, whereupon, the fingers are moved away from each other to form a loop in the tape withdrawn from the reels and then to drop the loop from the fingers and guide the inner surface of the loop into contact with at least part of the guide drum.

18 Claims, 22 Drawing Figures

INVENTORS
KATSU INAGA
YOTARO MIURA

BY Lewis H. Eslinger
ATTORNEY

INVENTORS
KATSU INAGA
YOTARO MIURA
BY [signature]
ATTORNEY

INVENTORS
KATSU INAGA
YOTARO MIURA
BY
ATTORNEY

INVENTORS
KATSU INAGA
YOTARO MIURA

BY

ATTORNEY

INVENTORS
KATSU INAGA
YOTARO MIURA
BY
ATTORNEY

INVENTORS
KATSU INAGA
YOTARO MIURA
BY
ATTORNEY

INVENTORS
KATSU INAGA
YOTARO MIURA

BY

ATTORNEY

INVENTORS
KATSU INAGA
YOTARO MIURA
BY
ATTORNEY

TAPE LOOP FORMING AND THREADING MECHANISM FOR USE WITH A MAGNETIC RECORDING AND REPRODUCING APPARATUS

This application is a continuation-in-part of our copending application, Ser. No. 37,694, filed May 15, 1970 the disclosure of which is incorporated herein by reference.

Video tape recorders (VTR) have become a popular entertainment and educational media in the past few years. Generally, a VTR comprises rotary magnetic heads which function to record or playback signals on a magnetic tape as the latter is wrapped about a guide drum. The tape is driven by a capstan, pinch roller and a take-up reel which are motor driven, and the motor drives the drum guiding the tape and the magnetic heads.

In order to operate a VTR, the tape must be placed around or wrapped on the drum for guiding the tape with respect to the rotary magnetic tape heads. Generally, the user must manually thread the tape from a supply reel around various guides on the VTR chassis, around the guide drum and thence back to the take-up reel. This operation requires a considerable degree of manual dexterity and can be time consuming. If the tape is not placed properly, it can jam the mechanism and if the operator's fingers have any residue thereon it can be passed to the tape and adversely affect its fidelity.

Automatic tape loading devices have been suggested in the prior art in order to overcome the aforementioned disadvantages, however, these devices were imperfect in that a great many electrical and mechanical failures occurred. These devices were also unsuccessful because the mechanisms employed to accomplish the desired results were complicated, difficult to manufacture because of their complexity, and expensive.

It has also been suggested that a spring driven mechanism be used to load the tape on the drum. This has proved successful, however, the operator must remember to tension or load the drive spring after each use. In view of the fact that electronic audio devices have many knobs and switches thereon it is most desirable to leave as few as possible steps for the operator to remember.

This invention has successfully overcome all the disadvantages of the prior art by utilizing a plurality of longititudinally movable and rotatable arms which are actuated by a motor automatically controlled by an electrical circuit so as to require of the operator only the initiation of the tape loading operation.

This is accomplished by having the cassette holder trip a safety switch so as to permit energizing of a motor. The motor drives a gearing arrangement which initially moves the arms longitudinally to pull the tape out of the cassette by means of depending fingers which engage the tape. Then, continued operation of the motor causes the gearing arrangement to rotate the arms so that the fingers define a loop in the tape and such loop is automatically placed around the tape drum and released from the fingers which are returned to their original positions.

When an ejection switch is actuated, the tape is automatically removed from the drum and is rewound into the cassette. The VTR then shuts itself off. Thus, it can be seen that the operator has very little to do in connection with loading tape in the VTR disclosed herein because it has been completely automated.

It is an object of this invention to provide a VTR wherein the operator need only lower a tape holder and actuate a loading switch to start the device whereby the tape is automatically loaded onto the guide drum.

It is another object of the invention to provide a tape loading mechanism having a plurality of arms with depending fingers which are controlled by a motor-driven gear arrangement which moves the fingers longitudinally and rotates them to place a tape on the guide drum.

It is yet another object of the invention to provide a tape loading device having a plurality of arms as aforementioned, and wherein some arms rotate in one direction and another arm rotates in the opposite direction to place a tape around the guide drum.

It is still a further object of the invention to provide a control circuit for the motor-driven gear arrangement by which, at the completion of the tape loading cycle, the direction of rotation of the drive motor is reversed to return the arms to their original positions.

It is an additional object of the invention to provide a mechanism which insures the proper placement of the tape about the guide drum to provide for scanning of the tape by the heads along skewed paths.

It is still a further object of the invention to provide a compact, easy to assemble and manufacture, inexpensive VTR device which is simple to operate.

Further objects and advantages of the present invention will unfold as the following description proceeds, and the features of novelty which characterize the invention will be pointed out with particularity in the claims appended to and forming part of this specification.

For a better understanding of this invention, reference may be had to the accompanying drawings, in which.

For the purpose of illustrating the present invention, a specific type of video tape recorder (VTR) is disclosed. It should be understood, however, that aspects of the present invention are applicable to the many varied tape mechanisms having supply and take-up reels, and in which it is desired to form a loop in the tape between such reels without having an operator take any affirmative steps in the operation except to activate an electrical circuit.

Figure 1:
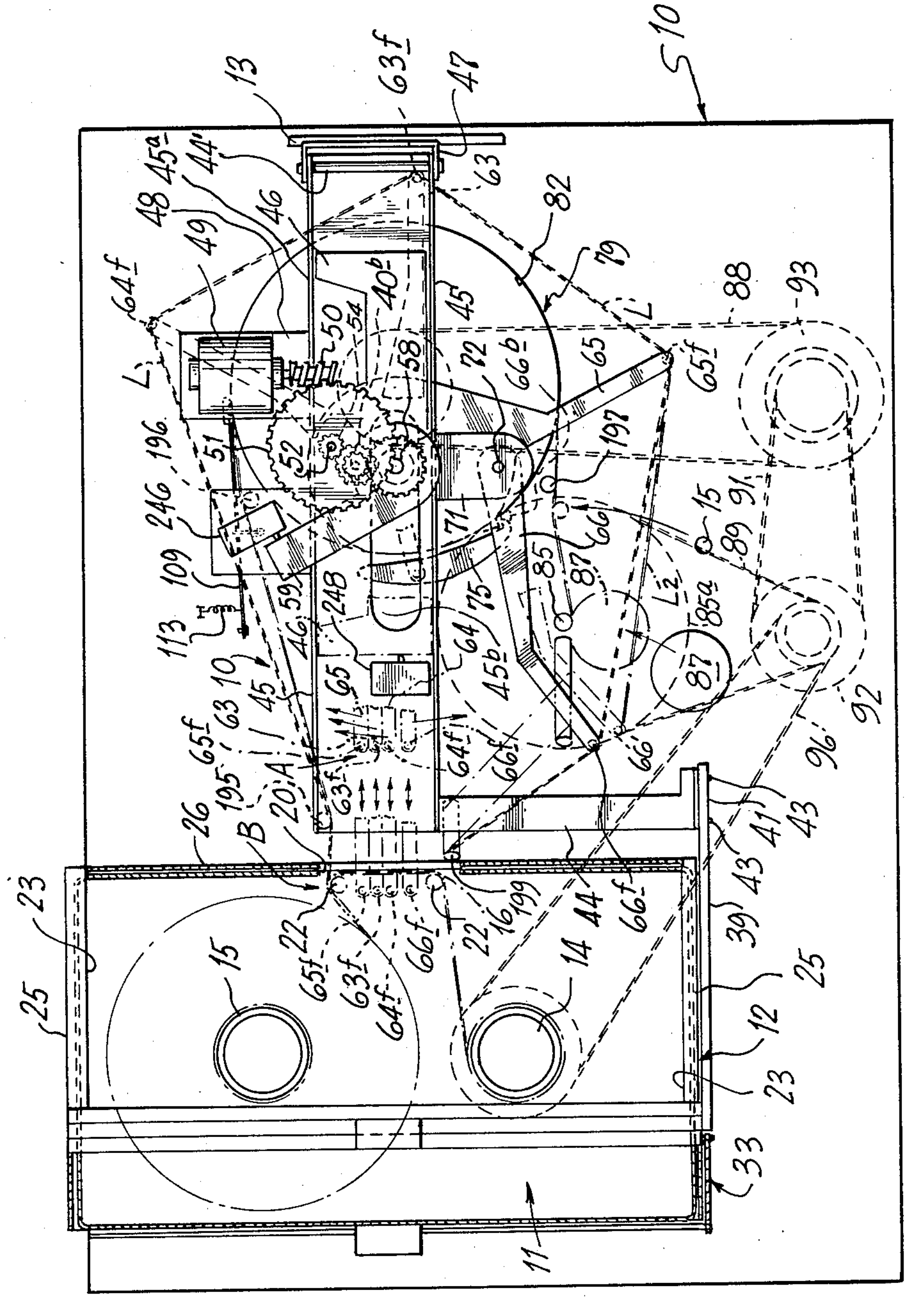
FIG. 1 is a plan view, partly schematic, showing one embodiment of a mechanism for automatically placing a tape about a drum.
Figures 2, 11:
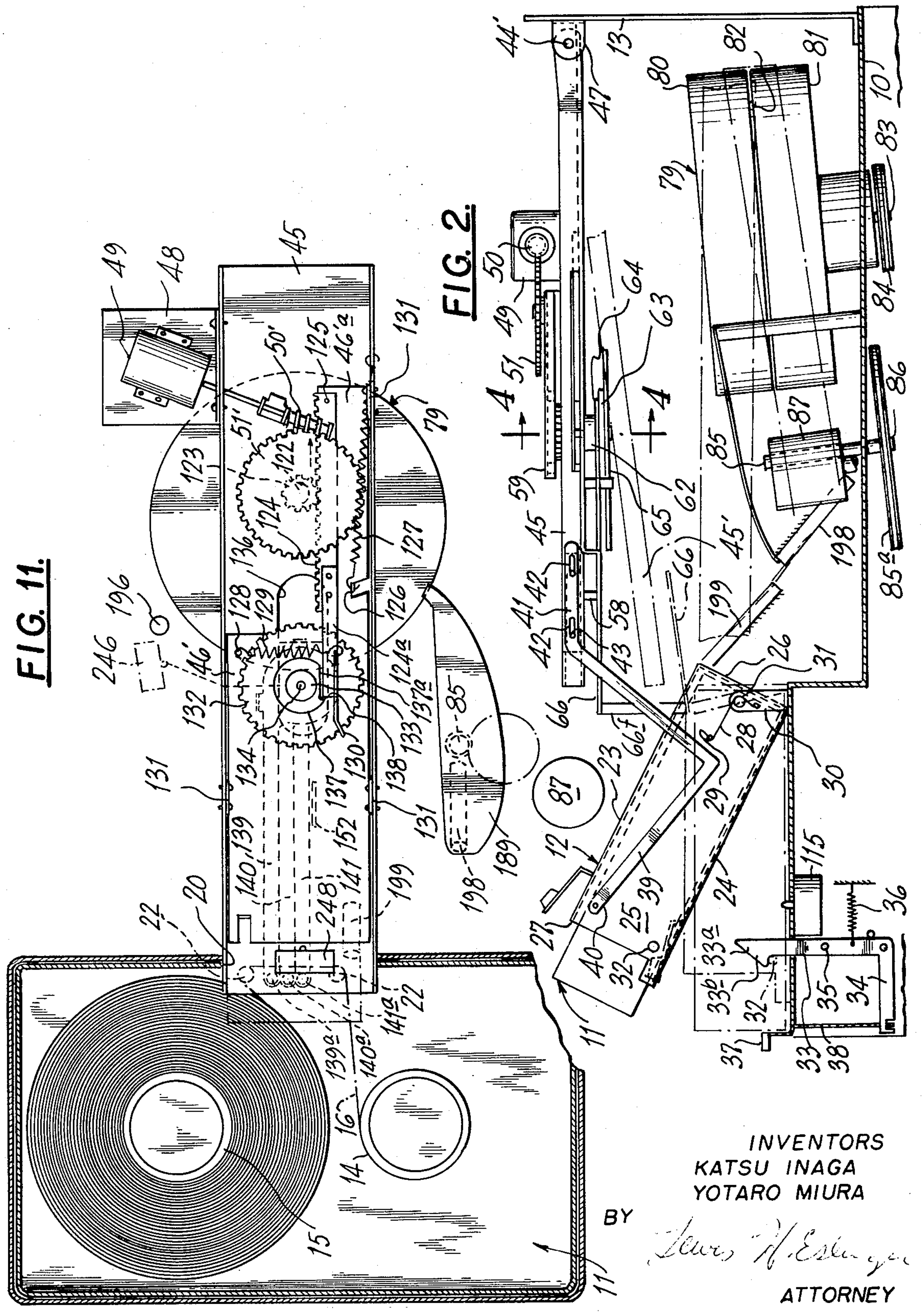
FIG. 2 is a side view of the embodiment shown on FIG. 1.
FIG. 11 is a plan view of a third embodiment of the invention.

Referring to FIGS. 1 and 2, there is shown a video tape recorder (VTR) chassis 10 and a tape cassette 11 which is to be received in a cassette holder 12. The chassis is preferably metallic and capable of supporting mechanical devices and electrical components and has an upstanding bracket 13 adjacent its back edge.

Figures 8, 10:
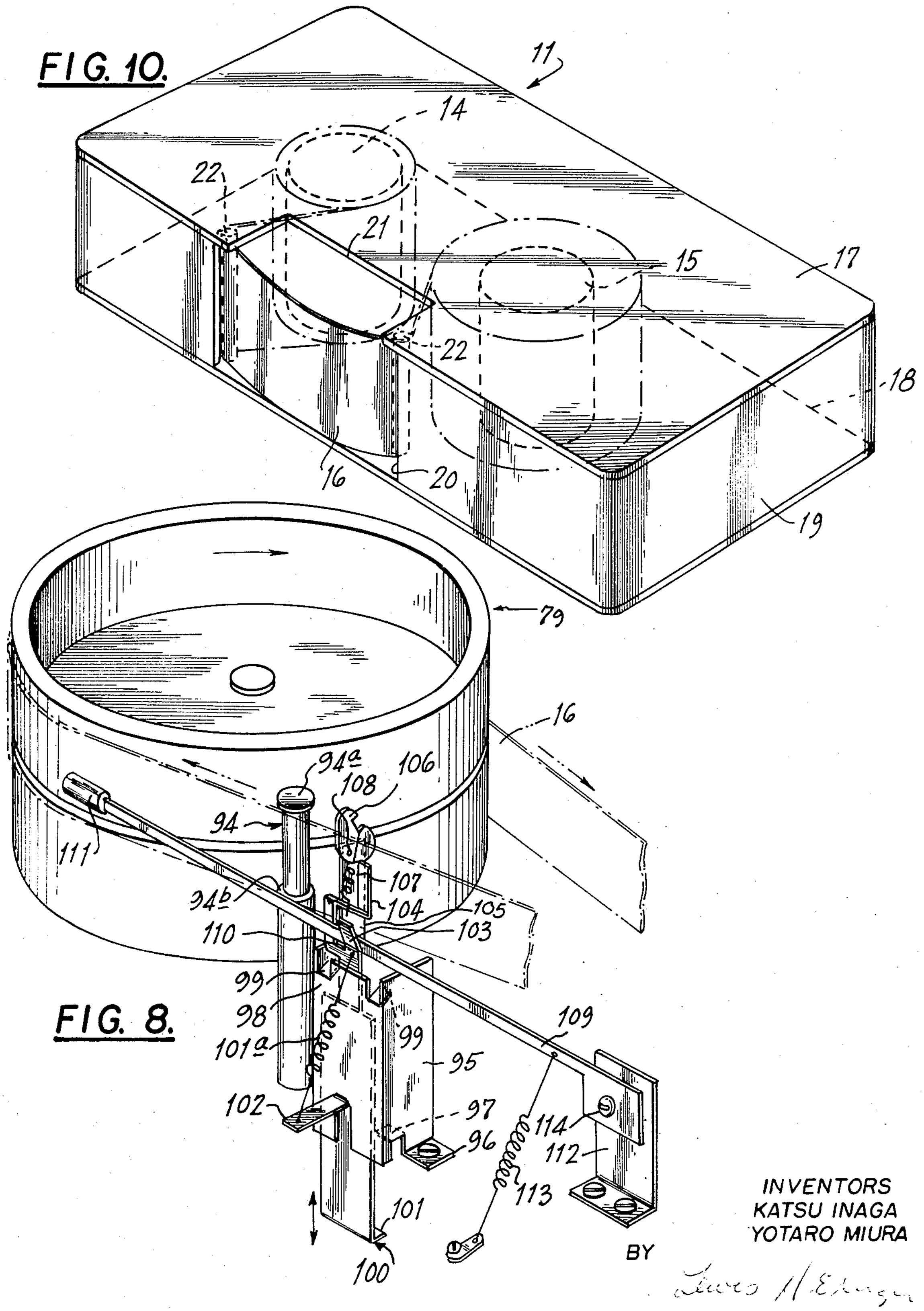
FIG. 8 is a perspective view showing a tape unloading mechanism.
FIG. 10 is a perspective view showing a tape cassette.

Turning now to FIG. 10, it will be seen that the cassette 11, as there depicted, includes a take-up reel 14 and a supply reel 15 upon which is contained a supply of magnetic tape 16. The take-up reel 14 and supply reel 15 can be mounted in the same plane between upper and lower walls 17 and 18 respectively. A sidewall 19 circumscribes a major portion of the periphery of the upper and lower walls 17 and 18 thereby enclosing the cassette 11 at least at the sides and front thereof. The back portion of the cassette 11 has an opening 20 therein past which the magnetic tape 16 extends. The upper wall 17 has a rectangular opening or cutout 21 therein which communicates with the opening 20. A pair of opposed tape guides 22 are secured on either side of the opening 20 and serve to maintain a portion of the tape exposed across the full width of the opening 20.

The holder 12 adapted to receive cassette 11 can be formed of any material, however, sheet metal has been found to be very convenient. The holder 12 (FIGS. 1 and 2) is formed with a lower wall 24 having sidewalls 25 and a rear wall 26 extending upwardly therefrom, and flanges 23 extending inwardly along the upper edges of the sidewalls 25. The holder 12 is open at the front, as at 27, and readily accommodates a cassetee 11 therein. The holder 12 pivotally mounted on chassis 10, as hereinafter described, and is biased upwardly at approximately a 30° angle so as to raise the front of holder 12, thereby enabling the operator to conveniently insert a cassette in the opening 27. A torsi on spring 28 (FIG. 2) which can be located on one or both sides of the holder 12 biases the holder to the upward position depicted in FIG. 2. The spring 28 bears at one end against a pin 29 on the adjacent sidewall of the holder and the other end of the spring bears against a pin on an upright ear 30. Intermediate its ends, spring 28 is wrapped around a pivot pin 31 which is carried by an ear 30 welded or otherwise secured to the chassis 10 and which extends into an opening in the adjacent sidewall 25 to constitute the pivotal mounting for holder 12. A pin 32 is attached to the sidewall 25 of the holder and extends outwardly therefrom adjacent the front of the holder. If desired an identical pin can be located on the opposite sidewall, however, one pin 32 has been found to be satisfactory. A latch lever having a vertical leg 33 and a horizontal leg 34 is pivotally mounted on a pin 35 secured to the chassis 10. The vertical leg has an inclined cam surface 33*a* at its upper end which terminates in a protruding nose 33*b*. As shown in FIG. 2, the lever leg 33 is biased in a counterclockwise direction by a spring 36 having one end secured to leg 33 and the other end to the chassis 10. The pin 32 rides on cam surface 33*a* when the holder 12 is lowered, and biases the lever leg 33 clockwise. When the pin 32 is at the end of the cam surface 33*a*, the nose 33*b* snaps over the pin and secures the holder 12 in the horizontal attitude indicated in broken lines on FIG. 2. The pin 32 can be released by pushing a handle 37 upwardly. The handle 37 has an arm 38 secured thereto and the end of the arm 38 engages under the horizontal lever leg 34. Thus, it is apparent that by lifting the handle 37 the lever 33, 34 is pivoted clockwise about the pin 35 and the nose 33*b* of the lever leg 33 releases the pin 32 and the holder 12 will be urged upwardly under the influence of the spring or springs 28. An L-shaped lever 39 has one end 40 pivotally connected to the forward end of one of the sidewalls 25 and the other end of the L-shaped lever has an angled extension 41. The extension 41 has elongated slots 42 formed therein and these slots fit over pins 43 which are fixed to a bracket 44 extending laterally from the forward end of an elongated loader plate 45.

The loader plate 45 is pivotally mounted, at its back end, on an axle 44′ which is journalled in opposed ears 47 fixed to the bracket 13 of the chassis. Since the plate 45 is pivotally mounted and connected to holder 12 by way of bracket 44 and lever 39, plate 45 is pivotally depressed to the position shown in phantom lines at 45′ on FIG. 2 when the holder 12 is lowered to its horizontal position. The loader plate 45 carries a slide plate 46 thereon. The slide plate 46 has ends which extend to a width slightly smaller than the width of the loader plate 45 and the area of plate 46 between its ends is reduced to approximately half the width of the loader plate as shown on FIG. 1.

Fixed to a flange 45*a* (FIG. 4) on the loader plate 45 is a motor support 48 upon which rests a D.C. motor 49. A worm gear 50 is pinned or otherwise secured to the motor shaft such that the worm gear 50 extends over the loader plate 45 as viewed in FIG. 1. The worm gear 50 drives a gear 51 which is fixed to a shaft 52 which is journalled on the loader plate 45. A boss 53 separates the gear 51 from a pinion 54 which is also fixed to the shaft 52. The pinion drives an idler gear 55 rotatable on a stub shaft 56 which is fixed to the loader plate 45. A pinion 57 is integral with the idler gear 55 to rotate with the latter on the shaft 56.

Figure 5:
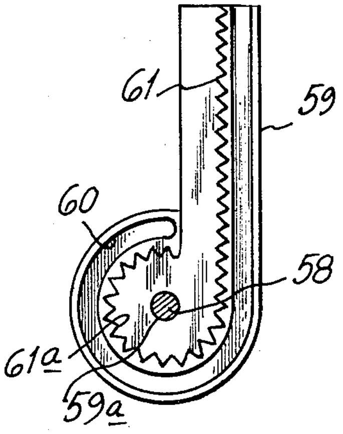
FIG. 5 is a plan view showing details of the underside of a control gear member.
Figure 4:
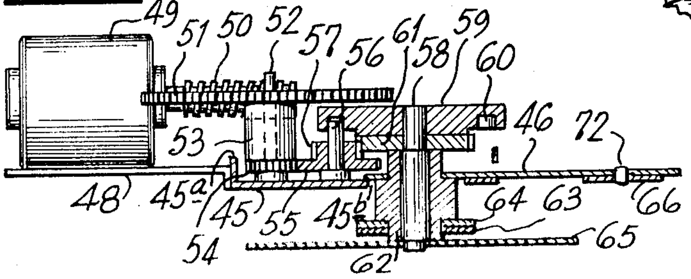
FIG. 4 is a view taken along the line 4—4 in FIG. 2.

At this point it should be noted that the loader plate 45 has an elongated opening 45b therein (FIGS. 1 and 4). A shaft 58 has secured thereto a gear member 59 in the form of a figure "6" having an opening 59*a* therein receiving shaft 58 (FIGS. 4 and 5). This member 59 has a guide groove 60 reamed or otherwise formed in the bottom surface. A rack gear 61 can be molded integrally with the member 59 or can be otherwise secured thereto. The rack gear 61, it will be noted, terminates in a circular geared portion 61*a* as shown in FIG. 5. In the event the rack gear 61 is molded separately from the member 59, the rack gear may be independently secured to the shaft 58. A bearing sleeve 62 is fixed to the slide plate 46 and the shaft 58 is rotatable within the sleeve 62. A plurality of longitudinal arms 63 and 64 are rotatably mounted on the lower reduced portion of the sleeve 62 and a longitudinal arm 65 is rigidly secured to the lower end of rotatable shaft 58. Thus, when the motor 49 is energized, the worm 50 turns gear 51 which rotates the shaft 52 thence the pinion 54 which drives the idler 55 thereby turning the pinion 57. The pinion 57 drives the rack gear 61 fixed to the shaft 58. The member 59 is thus moved longitudinally and the plate 46 is moved therewith along the loader plate 45. When the pinion 57 reaches the curved portion 61*a* of the rack gear 61, the member 59 is rotated thereby rotating the longitudinally arm 65 rigidly connected to the shaft 58.

Figures 3, 12, 13:
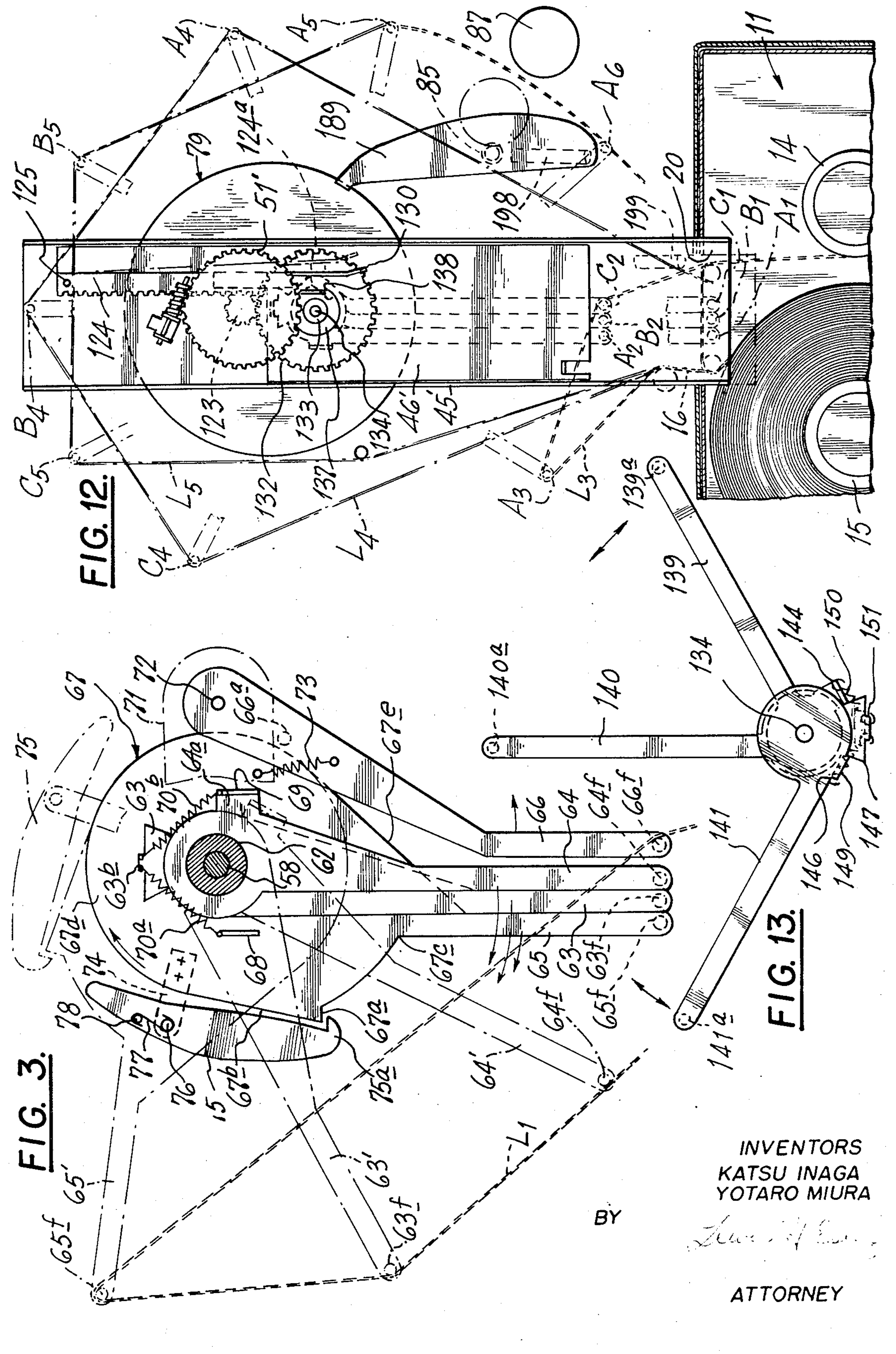
FIG. 3 is a plan view, partly schematic, showing details of an arm assembly included in the mechanism of FIGS. 1 and 2.
FIG. 12 is a plan view, partly schematic, of the third embodiment and showing various positions of the arms in the course of the tape-loading cycle.
FIG. 13 is a detail view showing the tape loading arm assembly of the third embodiment.

The arm 65 together with the arms 63 and 64 and an arm 66 mounted on slide plate 46 from a subassembly (FIG. 3) for withdrawing the tape 16 from the cassette 10 and forming it into a loop, as fully explained hereinbelow. The arm 65 secured to the shaft 58 is formed as an extension of a cam plate 67 and the arm can be integral with the cam plate or otherwise attached thereto. The cam plate 67 includes a straight line cam surface 67*b* which terminates at a lip 67*a*. The lip meets with a slightly curved portion 67*c* which joins one side of the arm 65. The straight cam surface 67*b* blends into a circular portion 67*d* which terminates in another straight line portion 67*e* which meets with the other side of the arm 65. An upstanding lug 68 is integrally formed with or otherwise secured to the cam plate 67. The arm 63 loosely mounted on the bearing sleeve 62 for rotation relative thereto is formed with an abutment 63*a* having tapered sides and being diametrically opposed to the arm 63. An upstanding post 63*b* is fixed to the abutment 63*a*. The arm 64 is located above the arm 63 and is also loosely mounted on the sleeve 62 for rotation relative to the arm 63. An upstanding lug 69 is integral with a laterally extending portion 64*a* on the arm 64. Springs 70*a* and 70*b* are connected at one end to the post 63*b* and have their other ends connected to the upstanding lugs 68 and 69 respectively. Thus, spring 70*a* biases arm 63 away from arm 65, in the counterclockwise direction as viewed on FIG. 3, and spring 70*b* similarly biases arm 64 away from arm 63. The extent to which arms 63, 64 and 65 can be thus spread apart or formed is determined by the engagement of abutment 63*a* with lug 68 and the engagement of lug 69 with abutment 63*a*. A lateral extention 71 is secured to the slide plate 46 or it can be integral therewith. The arm 66 is rotatably mounted on the extension 71 by means of a pin 72. A spring 73 having one end fixed to the arm 66 and the other end fixed to the extension 71 biases the arm 66 inwardly toward the cam plate 67 and a cam follower pin 66*a* depending from the arm 66 bears against the cam plate 67. The spring 73 is made stronger than the springs 70*a* and 70*b* so that, when arm 65 is in the position shown in full lines on FIG. 3, arms 63 and 64 will be clustered together between arms 65 and 66. Depending from the free ends of arms 63, 64, 65 and 66 are tape guide fingers 63*f*, 64*f*, 65*f* and 66*f* respectively. An arm 74 attached to the cam plate 67 carries a pin 76 that rotatably supports an auxiliary cam 75 which is biased so as to be normally spaced close to the cam plate 67 at the lip 67*a* with the gap between the two gradually increasing along the straight line portion 67*b* as shown in FIG. 3. The cam 75 is biased in a counterclockwise direction by a torsion spring 77 having one end secured to the pivot pin 76 and the other end bearing against a pin 78 on the cam 75.

When the holder 12 having a cassette 11 therein is lowered to the dotted line position shown in FIG. 2, a safety switch 115 is actuated to prepare a circuit for supplying current to the motor 49. When the loading button (not shown) is depressed it actuates a loading switch 115*a* (FIG. 7) in series with safety switch 115 to complete the circuit for energizing the D.C. motor 49. The fingers 63*f*, 64*f*, 65*f* and 66*f* are close to each other and in front of the tape 16 exposed at opening 20 of the cassette when the holder is lowered and the loader plate 45 is depressed. As the motor 49 rotates the worm gear 50, the gear member 59 is moved longitudinally to the right as viewed in FIG. 1. This moves the slide plate 46 to the right and the arms 63, 64, 65, 66 attached thereto are similarly moved. The tape 16 is thereby withdrawn from Point B in the cassette 11 and moved to the Point A shown in FIG. 1. At this point the circular portion 61*a* of the gear rack is reached by pinion 57 and the gear member 59 rotates clockwise thereby rotating the arm 65 away from arms 63, 64 and 66 in a clockwise direction, as shown in FIG. 3. When the lug 68 strikes the abutment 63a, the arm 63 starts to move with the arm 65. When the abutment 63a strikes the lug 69, the arm 64 begins to rotate. The arms are shown in dotted lines, at 65', 63' and 64', in the positions thereof at the moment when arm 64 begins to turn, and the tape 16 is pulled by the fingers to the position $L_1$ shown in dotted lines in FIG. 3. When the straight portion 67*b* of the cam 67 reaches the follower pin 66*a*, it moves the arm 66 in a counterclockwise direction, for example to the position shown in dotted lines at 66' on FIG. 1. In this position the tape is formed into a loop $L_2$ held by the fingers 63*f*, 64*f*, 65*f* and 66*f* above a drum 79. When the lip 67*a* reaches the pin 66*a*, the arm 66 is biased by spring 73 in a clockwise direction to the position shown in full lines on FIG. 1. The length of the tape loop $L_2$ is the longest when arm 66 is at the position 66'. During clockwise turning of cam plate 67, as viewed on FIG. 3, the follower pin 66*a* travels between auxiliary cam 75 and cam surface 67*b*. Further, auxiliary cam 75 may have a hooked end 75*a* to ensure that pin 66*a* will move across lip 67*a*. When the pin 66*a* is urged across the lip 67*a*, the movement of arm 66 to the position shown in full lines on FIG. 1 is violent and it shakes the tape 16 free of the fingers 63*f* to 66*f* whereby the tape drops over the drum 79. The take-up reel 14 takes up the slack and the tape is now in intimate contact with the drum.

In one form of the invention the gear member 59, at the completion of the loading operation, actuates a reversing switch 246 which reverses the current to the motor 49 as explained below thereby returning the gear member 59 and arms 63, 64, 65 and 66 to their original positions. If desired, however, the arms may be returned to their original positions during the unloading cycle. Tape guide pin members 195, 196, 197, 198 and 199 maintain the tape path in a desired configuration. When a push button (not shown) is depressed, a pinch roller 87 is displaced to the position 87' against a capstan 85 to thereby drive the tape 16 therebetween at a pre-selected speed. Since the pins 198 and 199 are canted, they maintain the tape 16 helically disposed about drum 79 so that magnetic heads 82 associated with the drum can scan helically on the tape.

The guide drum 79 includes an upper drum section 80 and a lower drum section 81. The magnetic heads 82 are disposed between the drum sections 80, 81, and in one form of the invention, the magnetic heads 82 are attached to and rotate with the upper drum section 80 which is secured to a rotatable shaft 83 driven by a pulley 84 (FIG. 2). A motor 93 and a belt drive 88 (FIG. 1) provide the motive force for rotating pulley 84. The capstan 85 is mounted on a shaft 86 rotated by means of a pulley 85*a* fixed on the shaft 86 and driven by a belt drive 89, 91 from motor 93. As seen in FIG. 1, a speed reduction mechanism 92 is also driven by belt drive 91 and drives the take-up reel 14 through a belt drive 96.

Referring now to FIG. 8, it will be seen that the tape 16 is guided to drum 79 by a tape guide 94 having an enlarged head 94*a* at its upper end and a shoulder 94*b* spaced downwardly from the head. The tape 16 rides between the head 94*a* and the shoulder 94*b* during normal operation. A U-shaped bracket 95 is secured to the chassis 10 by flanged feet 96 which are bolted to the chassis. Tabs 97 are bent inwardly from the sides of the U-shaped bracket 95 and serve to maintain a slide member 100 against a sidewall 98 of the bracket. A pair of inclined tabs 99 bent inwardly from the upper portion of wall 98 serve to cant or laterally change the direction of movement of the slide member 100 when engaged by the upper end of the latter. The slide member 100 can have a flange 101 at its lower end to be actuated by an actuating mechanism (not shown) when it is desired to remove or strip the tape 16 from guide drum 16. The slide member 100 is biased downwardly by a spring 101*a* which has one end secured to an upper portion of the slide member and its other end secured to a tab 102 which is formed on the wall 98 of the bracket. The upper end of slide member 100 is shown to include a curved finger 103 and a Z-shaped extension 104. Adjacent the top legs of the Z-shaped extension is a bent portion 105 of bracket 95 which functions as a support for a pivoted toggle 106. The toggle 106 is biased in a clockwise direction by a spring 107 secured at one end to the toggle 106 and at its other end to portion 105 of the bracket 95. The toggle 106 is pivotally mounted about the pin 108. It will be noted in FIG. 8 that a notch 110 is defined between the finger 103 and the lower leg of the Z-shaped extension 104. A longitudinal arm 109 rests in the notch 110. The arm 109 can have a friction tape gripping member 111, preferably of rubber, on its free end portion to frictionally grip the tape on guide drum 79 without damage to the tape. The arm 109 is pivotally mounted by a pin 114 on an upright bracket 112 which is bolted or otherwise secured to the chassis 10. A spring 113 is connected between chassis 10 and arm 109 to urge the latter downwardly into notch 110. When slide member 100 is lowered by spring 101*a* and lies flat against bracket wall 98, gripping member 111 on arm 109 is spaced radially outward from the tape 16 on drum 79.

Figure 9:
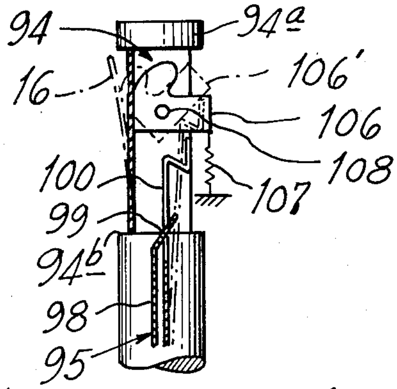
FIG. 9 is a sectional view showing a detail of the unloading mechanism.

To operate the tape ejection mechanism, the operator presses an "eject" button (not shown) which is linked to the slide member 100 by any known linkage mechanism, or a solenoid can be used in which case member 100 can be the armature of the solenoid. The slide member 100 is pushed upwardly as viewed in FIG. 8 against the bias of the spring 101a. During such upward movement of member 100, the latter rides against inclined tabs 99 which laterally cant the upper end portion of slide member 100 so that finger 103 laterally fluxes arm 109 to cause frictional engagement of gripping member 111 with the tape 16 as the arm 109 is rocked upwardly. Thus, member 111 engaged with the tape 16 and moved upwardly urges the engaged tape axially upward off drum 79. The rotary movement of the drum 79 assists in the tape removal also. Just prior to the engagement of member 111 with the tape to sweep it from the face of the drum 79, the Z-shaped extension 104 strikes the toggle 106 and pivots it counterclockwise against the bias of the spring 108 to the position shown in dotted lines at 106' on FIG. 9. The toggle 106 then urges the tape 16 away from the head 94*a* on guide 94. The tape can now be easily moved upwardly off the drum 79 by the arm 109 and the take-up reel 14 takes up the resulting slack and draws the tape back into the cassette 11.

During the return of gear member 59 to its original position after loading of tape 16 on drum 79, cam plate 67 turns counterclockwise, as viewed on FIG. 3, and pin 66*a* rides over nose 75*a* and along the outer surface of cam 75 so that pin 66*a* will not engage lip 67*a* and thereby interfere with such turning on cam plate 67.

Figure 7:
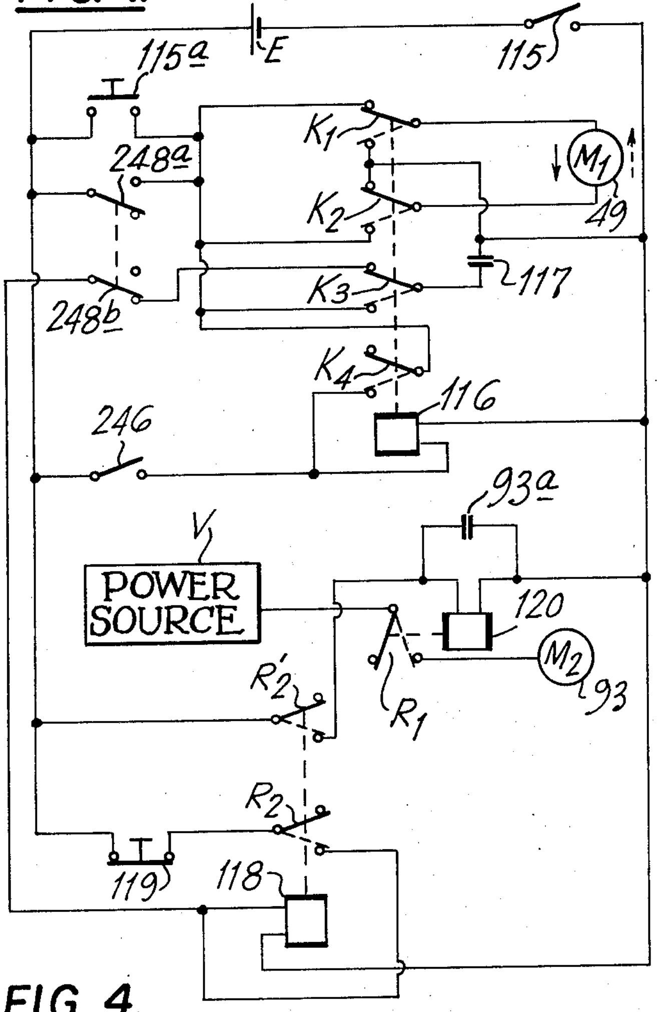
FIG. 7 is a schematic circuit diagram used to motivate the elements forming part of this invention.
Figure 14:
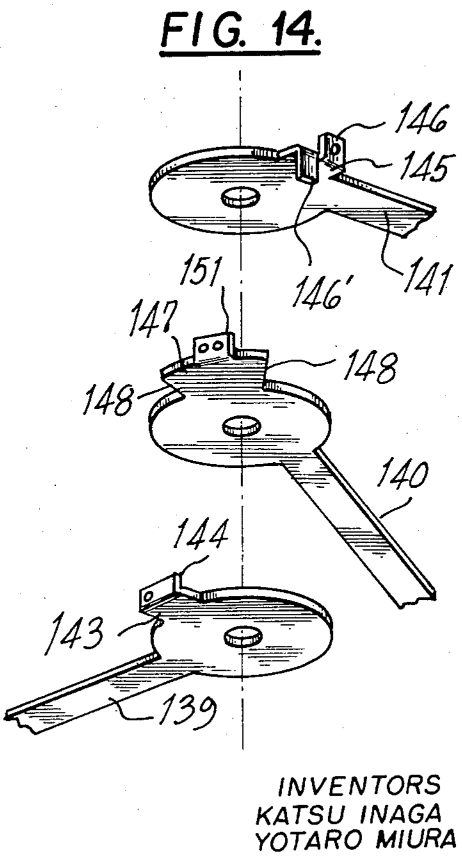
FIG. 14 is an exploded detail view of the hub portions of the tape loading arms of the third embodiment.

In order to control the return of the arms 63, 64, 65 and 66 to their "start" position before the tape is removed from drum 79, a novel circuit has been developed, as shown in FIG. 7. This circuit comprises a D.C. source E which, when the normally open loading switch 115*a* is closed, supplied D.C. current through the normally closed relay actuated contact $K_1$ to the D.C. motor 49, thence to the normally closed relay actuated contact $K_2$ and through the closed safety switch 115 to the D.C. source E. Thus, the motor 49 is actuated and as described above the worm gear 50 causes the gear member 59 to be longitudinally displaced, along with the slide plate 46, to the right as seen in FIGS. 1 and 2. The slide plate 46, during such movement, moves away from a switch 248 (FIG. 1) mounted on plate 45. When switch 248 is engaged or actuated by plate 46, it contacts 248*a* and 248*b* are respectively opened and closed, as shown on FIG. 7, and the movement of plate 46 out of engagement with switch 248, as described, permits contact 248*a* and 248*b* to return to their respective normal closed and opened conditions. As the gear member 59, after being longitudinally displaced, is then rotated to the position shown in FIG. 1, it closes the normally open switch 246. When the switch 246 is closed, D.C. current is supplied to a relay 116 which attracts the contacts $K_1$, $K_2$, $K_3$ and $K_4$ to the dotted line positions depicted in FIG. 7. When the contact $K_3$ is in the dotted position, D.C. current is supplied through the closed switch contacts 248a to charge a condenser 117. The relay 116 is kept energized by way of its hold-contact $K_4$ and maintains the contacts $K_1$, $K_2$, $K_3$ and $K_4$ in their dotted line positions. When the relay 116 is energized current passes from the source E through the switch contact 248a and the contact $K_2$ to the motor 49 and through the contact $K_1$ back to the DC voltage source E. However, since the current now flows through the dotted line connection, the current through the motor 49 is reversed, thereby changing the direction of rotation of the worm gear 50. This has the effect of rotating gear member 59 in the counterclockwise direction and then longitudinally to the left, as viewed in FIGS. 1 and 2, whereby the slide plate 46 is moved to the left and the arms are returned to their "start" position. When the slide lever 46 reaches the end of its travel, it again actuates switch 248 to open contact 248a and close contact 248b, whereby the relay 116 is deenergized and the contacts $K_1$, $K_2$, $K_3$ and $K_4$ return to their original full line positions shown in FIG. 7. When the latter occurs, the condenser 117 discharges through contact $K_3$ and through switch contact 248b to a relay 118, thereby energizing relay 118. When the relay 118 is energized, the contacts $R_2$ and $R_2'$ are attracted to the dotted line position shown in FIG. 7. The contact $R_2$ is a hold contact for relay 118 and the contact $R_2'$, when closed, energizes a relay 120 to close its contact $R_1$. The motor 93 is now energized from source V through contact $R_1$ to drive the drum 79, the capstan 85 and the take-up reel 14. When a normally closed switch 119 (which is actuable by the eject button) is opened, preferably simultaneously with the operation of the devices of FIGS. 8 and 9 for stripping the tape from drum 79 and guide pin 94, the relay 118 is deenergized and the contacts $R_2$ and $R_2'$ return to their solid line positions shown in FIG. 7. The motor 93 stops because relay 120 is deenergized to open its contact $R_1$ and motor 93 no longer receives current.

The purpose of the condenser 93a connected across relay 120 is to continue the energization of relay 120 for a short period after contact $R_2'$ has opened, whereby motor 93 continues to operate for that short period to ensure that the tape is driven off the drum at the completion of the unloading cycle and is wound on the take-up reel.

If desired the circuit shown in FIG. 7 can be modified to permit return of the arms to their original position at any time after the loading operation is completed, for example after unloading is completed.

Figures 6, 17, 18, 21:
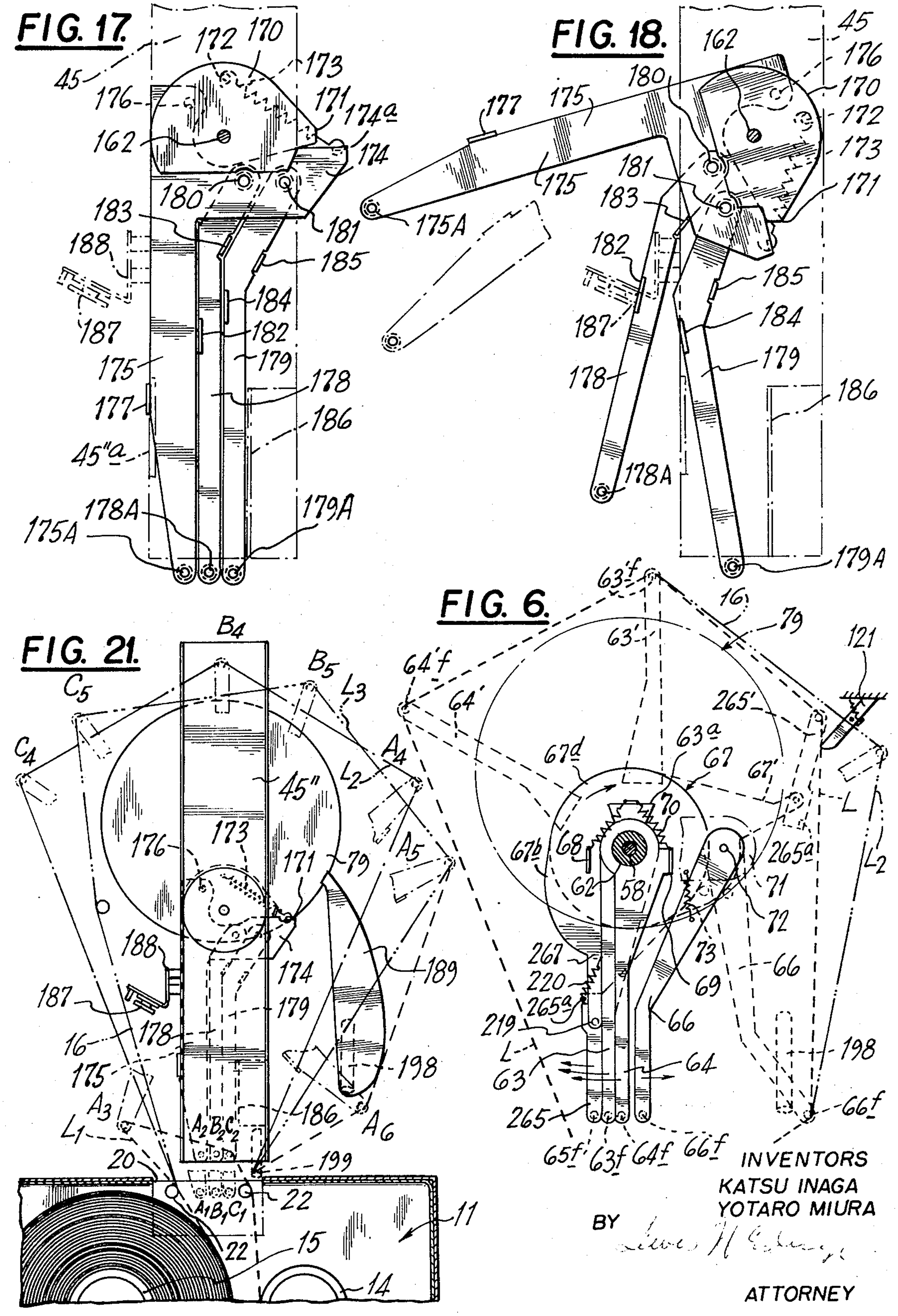
FIG. 6 is a view similar to that of FIG. 3, but showing a second embodiment of the invention.
FIG. 17 is a plan view showing the tape loading arms in closed position.
FIG. 18 is a view similar to that of FIG. 17, but showing the tape loading arms in a partly open or fanned position.
FIG. 21 is a plan view, partly schematic, showing the movement of the tape loading arms with respect to the drum and the tape of the fourth embodiment.

In FIG. 6, there is shown a second embodiment of the invention which is a modification of that shown in FIG. 1. For convenience of description, the same reference numerals have been used to indicate corresponding parts of the second embodiment with the exception of those parts which are modified. Thus, it will be seen that the arm 65 rigidly joined to the cam plate 67 in FIG. 1, is replaced by an arm 265 pivotally connected, as by a pin 219, to an extension 267 of cam plate 67. A spring 220 holds the pivoted arm 265 in alignment with extension 267 and one end of the spring is connected to extension 267 and the other end of the spring is connected to a lug 265a on arm 265 which engages extension 267 to properly align the arm therewith. As clearly shown in FIG. 6, when the cam plate moves to the position shown in broken lines at 67', the arm 265 strikes an abutment 121 mounted on chassis 10, whereby arm 265 is forced to swing inwardly, for example, as indicated in broken lines at 265', for relieving the tension it creates in the tape 16, and the tape readily leaves the fingers 63'f, 64'f, 65'f and 66'f. The operation of the remaining arms is otherwise identical to the embodiment disclosed in FIG. 1.

Figures 15, 16:
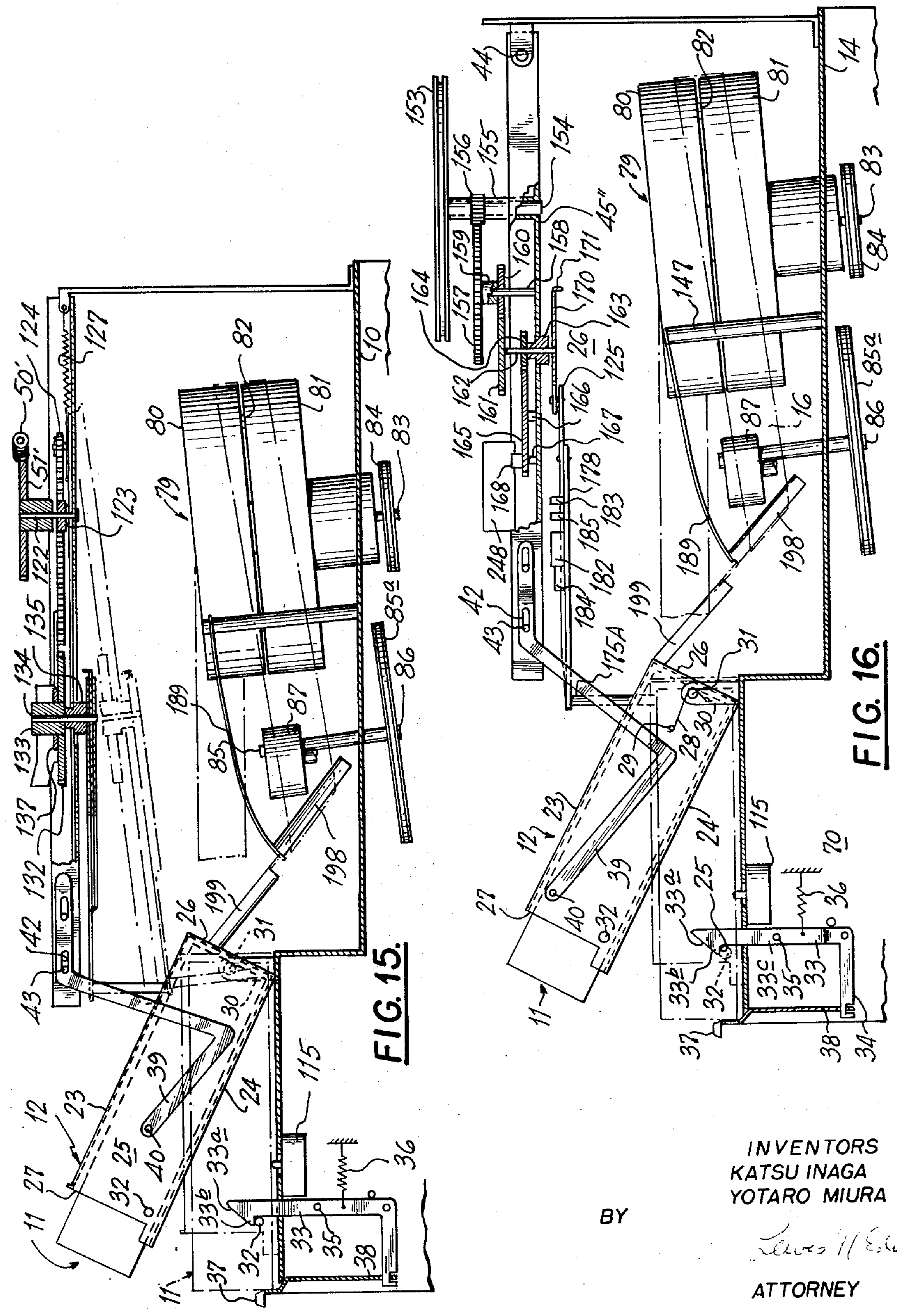
FIG. 15 is a side view of the third embodiment.
FIG. 16 is a side view, partly in section, of a fourth embodiment of this invention.

In FIG. 11 there is shown a third embodiment of a mechanism for forming a loop in the tape around the drum 79. In this embodiment, a motor 49 drives a worm gear 50' which rotates a gear 51' secured to a rotatable shaft 122 which is rotatably secured to a loader plate 45'. A pinion 123 is secured to the shaft 122 so as to mesh with a rack gear 124. The rack gear 124 is pivotally secured, at one end, to a side plate 46', as by a pin 125. The other end of rack gear 124 has a plate extension 124a' thereon. The slide plate 46' has an upstanding lug 126 secured to its leg portion 46'a along which rack gear 124 extends. A spring 127 has one end secured to the lug 126 and the other end secured to the loader plate 45'. An upstanding post 128 on the slide plate 46' has one end of a spring 129 secured thereto and the other end of such spring is fastened to a plate 130 on the rack gear extension 124a; thus, the rack gear 124 is biased in the direction for meshing engagement with pinion 123. The plate 46' is held within the plate 45' which is of U-shaped cross-section by abutments 131 which are welded, screwed or otherwise secured to the upstanding flanges forming the sides of the plate 45'. As the worm gear 50 rotates the gear 51, the pinion 123 rotates and moves the rack gear 124 to the right, as viewed in FIGS. 11 and 15. Since the slide plate 46' is connected to the rack gear 124 it moves to the right also. Carried on the slide plate is a gear 132 having a bearing sleeve 133 fixed thereto. The sleeve 133 is fastened to a rotatable shaft 134. A sleeve bearing 135 (FIG. 15) is also secured to the shaft 134 and extends through an elongated opening 136 in the loader plate 45'. A cam 137 is fixed to the gear 132 around sleeve 133 and has a portion 137a of its circumference cut out to form a nose 138.

Upon sufficient movement of the slide plate 46' to the right, as viewed on FIG. 11, the gear 132 meshes with the pinion 123, as shown on FIG. 12. The pinion 123 thereby rotates the gear 132 and the cam 137 in a clockwise direction. The rack gear extension 124a is biased against the cam 137 by the spring 129 and initially the rack gear extension fits into the cutout 137a of the cam. However, as the cam 137 rotates, the rack gear 124 is pivoted counterclockwise about the pin 125 whereby the teeth on the rack gear become disengaged from the teeth on the pinion 123.

Arms 139, 140 and 141 having depending fingers 139A, 140A and 141A are mounted on the shaft 134 below loader plate 45'. The arm 139, which is fixed to shaft 134, has an outward extension 143 having an upstanding lug 144 thereon. The arm 141 is similar to arm 139 except that it is not rigidly secured to the shaft 134 but is loosely mounted thereon for relative rotation thereto. The arm 141 also has an extension 145 having an upstanding lug 146 and a depending lug 146' thereon. The arm 140 also is not rigidly secured to the shaft 134 but is loosely mounted thereon for relative rotation thereto between arms 139 and 141. An extension 147 forms the rear contour of the arm 140 and has tapered edges 148 forming abutments to engage the lugs 144 and 146'. Springs 149 and 150 (FIG. 13) are connected at one end to lugs 144 and 146 respectively and at the other end to an upstanding lug 151 on the extension 147, thereby biasing the arms to fan away from each other, as shown in FIG. 13. A stop 152 (FIG. 11) depends from loader plate 45' and is engageable with arm 141. Thus, when arm 139 is in the position shown on FIG. 11, the fanning of arm 141 away from arm 139 is prevented by stop 152 and the arm 140 is held between arms 139 and 141. However, it can be seen that, when the shaft 134 rotates the arm 139 fixed thereto, the arms 140 and 141 are fanned away from arm 139 to the extent permitted by the engagement of lugs 144 and 146' with edges 148. The fingers **139*a*, 140*a* and 141*a* thereby move in a circular path and place the tape 16 around the drum 79**.

Referring to FIG. 12, the movements of the arms 139, 140 and 141 will now be explained in relation to the manner in which they place the tape 16 around the drum 79. Initially the arms are located at points $A_1$, $B_1$, $C_1$ so that the fingers **139*a*, 140*a*, and 141*a* are disposed in front of the tape 16 extending across the cassette opening 20. When the motor 49 is energized, the rack gear 124 and plate 46' move rearwardly, that is, upwardly as viewed in FIG. 11, so that the arms move to the positions $A_2$, $B_2$ and $C_2$, whereby the tape 16 is pulled out of the cassette 11. When the fingers begin to rotate, as explained above, in a clockwise direction as viewed in FIG. 12, the finger 139*a* moves from point $A_2$ to point $A_3$ and the tape loop takes the form shown at $L_3$. The arm 140 commences to rotate from point $A_2$ when the lug 144 strikes the abutment edge 148. When the other side of the abutment 147 strikes the lug 146', the arm 141 begins to rotate. Eventually the arms move to the positions $A_4$, $B_4$, $C_4$, and the resulting tape loop $L_4$ is the longest. When the arms move further to the positions $A_5$, $B_5$, $C_5$, ($L_5$) the distance $L_5$ around the positions $A_5$, $B_5$, $C_5$ is smaller, therefore, slack is developed in the tape, falls from the fingers 140*a* and 141*a* under the influence of gravity, and extends around the drum 79. A tape receiving guide 189 is suitably mounted on the chassis 10 to extend under the run of the tape 16 between finger 139*a* and the guide pin 199 when arm 139 reaches the positions $A_5$. Thus, when the tape loop is freed or becomes slack, the run of the tape extending back to the cassette 11 from finger 139*a* rides on guide 189 and continues to be engaged by finger 139*a* as the latter moves to the positions $A_6$. When the finger 139*a* of arm 139 reaches the positions $A_6$, the tape rides off guide 189 and drops to engage the slanted guide pin 198. Thus, the tape is wrapped helically around drum 79 so that the magnetic heads will trace skewed paths or tracks on the tape engaged with the drum. After the tape is thus positioned around drum 79, the motor 49 is reversed, for example, as explained with reference to the circuit shown in FIG. 7**, and the arms are thereby returned to their original positions.

Referring now to FIGS. 16 to 21, in which still another embodiment of this invention is illustrated, it will be seen that the various parts corresponding to those described above with reference to the embodiment of FIGS. 1–5 are identified by the same reference numerals and, for the sake of convenience, will not be again described in detail.

In the embodiment presently being described, the loader plate 45'' has a sleeve or bushing 155 in which a shaft 154 is journalled. Secured on shaft 154 above bushing 155 are a pulley 153, to be driven by a belt (not shown) from a suitable motor (not shown), such as the motor 49 on FIG. 1, and a pinion 156. The pinion 156 meshes with a gear 157 which is rotatable on an axle 158 projecting from plate 45''. Also rotatable on axle 158, and joined to gear 157 by a bushing 159, is a gear 160 which, in turn, meshes with a gear 161 secured on the upper end of a shaft 162. The shaft 162 is journalled in a bushing 163 carried by plate 45'' and, at its lower end, shaft 162 has a plate 170 secured thereto. Thus, in response to energization of the motor provided for driving pulley 153, for example, as described with reference to FIGS. 1 and 7, the plate 170 is made to rotate.

Figures 19, 20, 22:
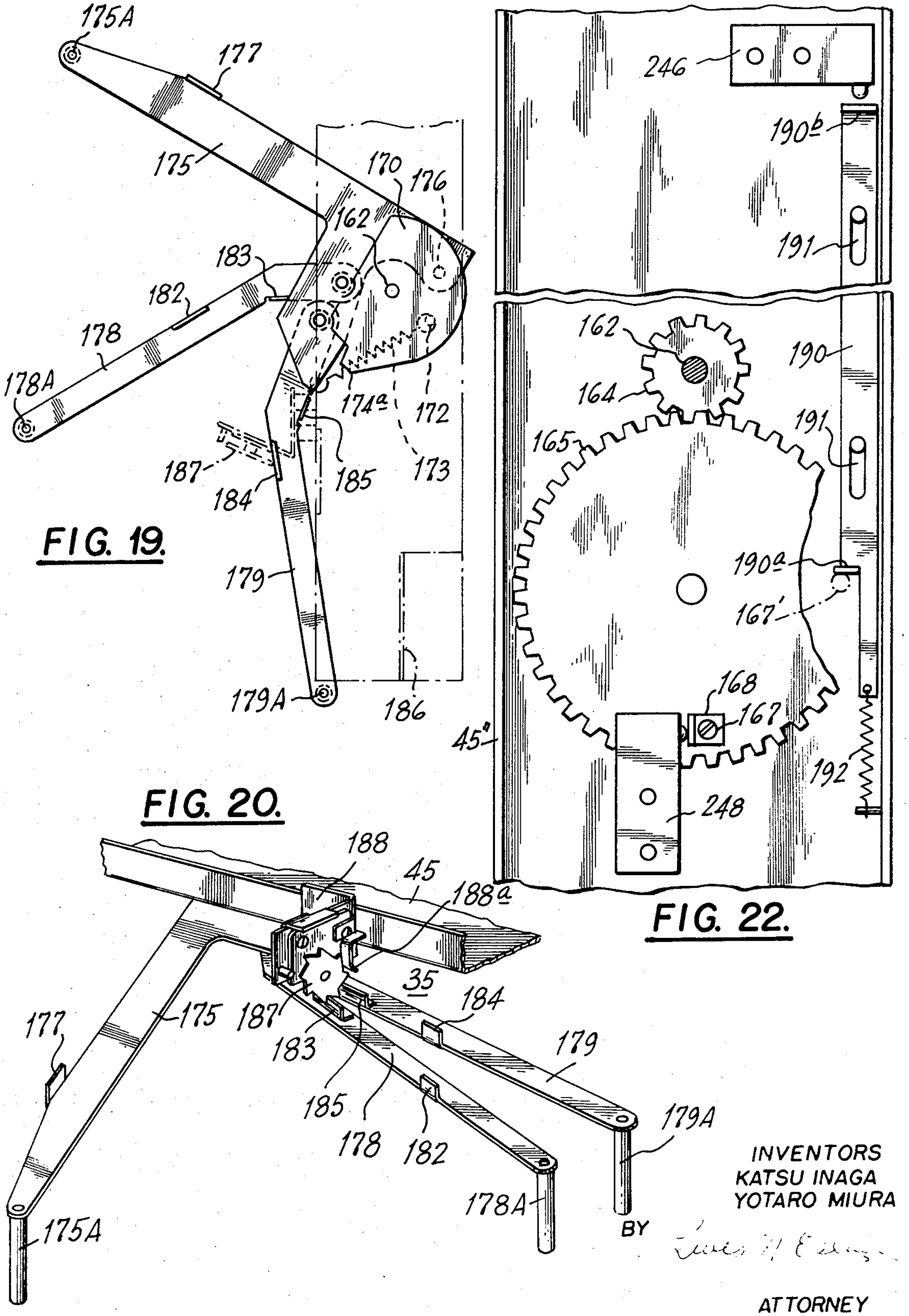
FIG. 19 is a view showing the tape loading arms in a further open position.
FIG. 20 is a view showing the coaction of the tape loading arms with a ratchet.
FIG. 22 is an enlarged detail plan view showing switches and the actuators therefor for controlling the operation of the embodiment of FIG. 16.

As shown particularly in FIGS. 17 to 19, the arm assembly for loading the tape about the guide drum includes three arms 175, 178 and 179. The arm 175 is pivotally mounted, at one end, on a pin 176 which is carried by plate 170 at a location radically offset from the shaft 162. A spring 173 is connected, at one end, to a post 172 depending from plate 170 and, at its other end, to a tab **174*a* depending from the free end portion of a leg 174 which extends at right angles to, and is integral with the arm 175. The spring 173 urges arm 175 to pivot relative to plate 170 in the counterclockwise direction, as viewed on FIGS. 17 to 19, and such pivotal movement is limited by the engagement of a tab 171 depending from plate 170 with an edge of the leg 174 on arm 175**.

The arms 178 and 179 are pivotally mounted, at one end, on pivot pins 180 and 181, respectively, carried by the leg 174 so as to be swingable relative to arm 175 between the closed condition of FIG. 17, in which the three arms extend generally parallel to each other, and the opened or fanned condition of FIG. 19, in which the arms 175, 178 and 179 are angularly spaced from each other. An abutment 186 depends from loader plate 45'' and is engageable with arm 179 to hold the arms 175, 178 and 179 close to each other in the closed condition when arm 175 is in the position shown on FIG. 17. Arm 175 has an upstanding tab 177 engageable with a flange **45''*a* depending from loader plate 45'' to limit the counterclockwise swinging of arm 175 to the position shown on FIG. 17. Further, arms 178 and 179 have upstanding tabs 182 and 184, respectively, which are engageable by the arms 175 and 178, respectively, as shown on FIG. 17, to ensure that the several arms will not overlap when the parallel, closed position. The arms 178 and 179 further have upstanding tabs 183 and 185, respectively, which are positioned to cooperate, as hereinafter described, with a ratchet 187 (FIG. 20) rotatably mounted on a bracket 188 secured to a side flange of the loader plate 45''**.

The arms 175, 178 and 179 have fingers 175A, 178A and 179A depending from their respective free ends. At the time of commencement of a tape-loading operation, plate 170 is angularly turned through about 90° in the counterclockwise direction from the position thereof shown on FIG. 17 so that, by reason of the eccentric position of pivot pin 176 relative to the shaft 162 carrying plate 170, the fingers 175A, 178A and 179A are positioned forwardly of the positions shown on FIG. 17, for example, at the positions $A_1$, $B_1$ and $C_1$ on FIG. 21. Thus, when a cassette 11 is placed in holder 12 and the latter is rocked downwardly to its locked horizontal position, the depression of the forward end of loader plate 45'' by the action of lever 39 will cause the fingers 175A, 178A and 179A to enter the opening 21 of the cassette in front of the tape stretched across the opening 20 at the back of the cassette. When pulley 153 is rotated, as described above, the gear train between the pulley and the shaft 162 rotates the plate 170 in the clockwise direction to the position of FIG. 17. Since the arm 175 is eccentrically mounted on the plate 170, such rotation of the plate 170 moves the fingers 175A, 178A and 179A from the forward positions $A_1$, $B_1$ and $C_1$ depicted in FIG. 21 to the rearward positions $A_2$, $B_2$, $C_2$, and this movement serves to withdraw the tape 16 rearwardly from the cassette 11. When the fingers are fully withdrawn, the tab 171 on the plate 170 abuts against the leg 174, as shown on FIG. 17, so that arm 175 thereafter follows the continued clockwise rotation of plate 170 and the arms 178 and 179 tend to be carried along in such rotation of arm 175. As the arm 178 moves clockwise, as viewed in FIG. 18, the tab 182 strikes a tooth on the ratchet 187 which serves to impede the movement of the rotatable arms 178 and 179. The ratchet is held against free wheeling rotation by a resilient pawl 188a (FIG. 20) which bears yieldably on the teeth of the ratchet. As the lever 175 continues its unimpeded rotation with plate 170, the leg 174 strikes the upstanding tab 183 on the arm 178 as shown in FIG. 19 whereby the ratchet wheel 187 is forced to rotate against the bias of the yieldable pawl *188a* and thereby frees the arm 178 for continued rotation following the arm 175. As the plate 170 continues to rotate, the tab 184 similarly is engaged by the tooth on the ratchet 187. The yieldable hold which the ratchet maintains is overcome, however, when the tab *174a* strikes the arm 179 thereby freeing the arm for continued rotation.

The effect of the rotation of the arms 175, 178 and 179 will now be explained with reference to FIG. 21.

As the arm 175 first begins its clockwise rotation, the finger 175A pulls the tape to point $A_3$ forming the tape loop $L_1$. When the arms 175, 178, 179 are at the positions $A_4$, $B_4$, $C_4$, the loop length ($L_2$) is the longest of all positions. As the arms continue their rotation to the positions $A_5$, $B_5$, $C_5$ the loop length ($L_3$) is smaller than ($L_2$) so that the tape is slack and therefore drops from the fingers 178A and 179A by gravity and encircles the tape drum 79.

A part of the released tape drops onto the tape guide 189 and while engaged with the latter is contacted by the finger 175A of the arm 175 which, in moving further to the position $A_6$, carries the tape 16 off guide 189 and around the slanted guide pin 198. The tape is now higher at one side of the drum and lower on the side where the slanted guide pin 198 is located so that the rotating magnetic heads will scan skew tracks on the tape.

Referring now to FIG. 22, it will be seen that the controls for the embodiment of FIGS. 16 to 21 may include the switches 246 and 248 arranged in a circuit similar to that described above with reference to FIG. 7. The switch 248 is suitably mounted on loader plate 45'' to be actuated by an abutment 168 mounted on gear 165 when the latter is in the position shown on FIG. 22, which position corresponds to the starting positions of the arms 175, 178 and 179. The actuating mechanism for the switch 246, which is also mounted on loader plate 45'', may include a slide 190 guided for longitudinal movement relative to plate 45'', as by pin- and-slot connections 191, and being urged forwardly by a spring 192. A tab *190a* projects upwardly from slide 190 and extends into the path of travel of the bolt 167 which secures abutment 168 to gear 165 and which projects downwardly from the latter.

When gear 165 has been turned in the counterclockwise direction from the position shown on FIG. 22 to the position thereof corresponding to the location of the arm 175 at the position $A_6$ on FIG. 21, that is, at the completion of the tape-loading operation bolt 167 is moved to the position indicated in broken lines at 167' on FIG. 22 and engages tab 190a to displace slide 190 rearwardly against the force of spring 192. Such rearward displacement of slide 190 causes a tab *190b* at the back end thereof to actuate adjacent switch 246 and thereby cause reversal of the motor for driving pulley 153. Thus as in the previously described embodiments, after the arms 175 178 and 179 have been fanned-out to form a loop in the tape and to deposit the loop around the guide drum 79, the arms may be automatically returned to their original positions. Alternatively, the circuit for controlling the motor which drives pulley 153 and the switches actuated by abutment 168 and slide 190 may be arranged so that arms 175, 178 and 179 are returned to their original positions only after the tape has been unloaded from guide drum 79 as described with reference to FIG. 8.

Having described particular embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a magnetic recording and/or reproducing apparatus, the combination of a chassis, means on said chassis to rotatably support take-up and supply reels having a magnetic tape wound on said reels and extending between the latter, rotary magnetic head means for recording and/or reproducing signals on said tape and being movable in a circular path spaced from said reels, a tape guide drum having its periphery coinciding with said circular path to guide the tape during said recording and/or reproducing by said head means, a plurality of tape guiding fingers, a plurality of arms having said fingers respectively depending therefrom, means pivotally supporting said arms for relative angular displacements of the latter in a plane extending above said guide drum and during which angular displacements the respective fingers move in arcuate paths extending around portions of said periphery of the guide drum, means initially positioning said arms close together for engagement of said fingers from above with said tape extending between said reels, and actuating means including means for angularly displacing at least a first one of said arms in one direction and the remainder of said arms in the opposite direction so that said fingers withdraw tape from said reels and form a loop in the withdrawn tape above said guide drum and means for releasing said loop from said tape guiding fingers so that the loop falls around said guide drum and has the inner surface of said loop in contact with at least a part of said periphery of the tape guide drum.

2. In a magnetic recording and/or reproducing apparatus, the combination according to claim 1, in which said means for releasing said loop from said tape guiding fingers acts on at least one of said arms for finally reducing the aggregate distance between said reels which circumscribes said fingers so that slack is created in said tape loop.

3. In a magnetic recording and/or reproducing apparatus, the combination according to claim 1, in which said means for releasing said loop from said tape guiding fingers acts on said first arm to effect a final reverse angular displacement thereof for creating slack in said loop.

4. In a magnetic recording and/or reproducing apparatus, the combination according to claim 1, in which one of said arms has a pivoted extension carrying the respective tape guiding finger, and said means for releasing said loop from said tape guiding fingers includes an abutment in the path of said pivoted extension to pivot the latter relative to the remainder of said one arm during final angular displacement of the latter for creating slack in the tape loop.

5. In a magnetic recording and/or reproducing apparatus having a chassis, means on said chassis to rotatably support take-up and supply reels having a magnetic tape wound on said reels and extending between the latter, rotary magnetic head means for recording and/or reproducing signals on said tape and being movable in a circular path spaced from said reels, a tape guide drum having its periphery coinciding with said circular path to guide the tape during said recording and/or reproducing by said head means, a plurality of fingers, a support plate, a slide member movable rectilinearly along said support plate, and arms having said fingers respectively depending therefrom and being rotatably mounted with respect to said slide member so that angular displacements of said arms cause movement of said fingers toward and away from each other and displacement of said slide member relative to said support plate causes movement of said fingers, as a group, toward and away from said reels; motor driven actuating means initially disposing said fingers at a starting position close to each other for engagement with the tape between said reels and comprising a driven pinion and gear means including a rack gear portion and a circular gear portion successively engaged by said driven pinion to effect movement of said slide member along said support plate for moving said fingers as a group while close together from between said reels and then to effect angular displacement of said arms for moving the fingers away from each other to form the tape engaged by the fingers into a loop which is guided into contact with at least a portion of said periphery of the tape guide drum.

6. In a magnetic recording and/or reproducing apparatus, the combination according to claim 5, in which said rack gear portion and said circular gear portion are integral parts of a gear member of "6" shaped configuration.

7. In a magnetic recording and/or reproducing apparatus, the combination according to claim 5, in which said rack gear portion is mounted on said slide member for movement toward and away from said pinion and is spring urged toward the latter, said circular gear portion is rotatably mounted on said slide member adjacent an end of said rack gear portion so as to be engaged by said pinion when said end of the rack gear portion meshes with said pinion, and cam means are rotatable with said circular gear portion to move said gear rack portion out of engagement with said pinion upon rotation of said circular gear portion by said pinion.

8. In a magnetic recording and/or reproducing apparatus, the combination according to claim 5, in which said motor driven actuating means is operative to effect angular displacement of at least a first of said arms in a direction opposite to the angular displacement of the other arms.

9. In a magnetic recording and/or reproducing apparatus, the combination according to claim 8, in which there are three of said other arms, said other arms are rotatably mounted with respect to said slide member by means of a driven shaft having one of said three arms secured thereon and the other two of said three arms freely rotatable on said shaft, and said actuating means further includes cam means rotatable with said one of the three arms and being operative to angularly displace said first arm in said direction opposite to the displacement of said one arm.

10. In a magnetic recording and/or reproducing apparatus, the combination according to claim 9, in which said cam means has a cam surface portion to cause a reverse angular displacement of said first arm for said final reduction of said aggregate distance between said reels and circumscribing said fingers.

11. In a magnetic recording and/or reproducing apparatus, the combination according to claim 9, in which said one of the three arms has a pivoted extension carrying the respective finger and there is an abutment in the path of said pivoted extension to pivot the latter relative to the remainder of said one arm during final angular displacement of the latter, and thereby to cause said final reduction of said aggregate distance between said reels and circumscribing said fingers.

12. In a magnetic recording and/or reproducing apparatus, the combination of a chassis, means on said chassis to rotatably support take-up and supply reels having a magnetic tape wound on said reels and extending between the latter, rotary magnetic head means for recording and/or reproducing signals on said tape and being movable in a circular path spaced from said reels, a tape guide drum having its periphery coinciding with said circular path to guide the tape during said recording and/or reproducing by said head means, a plurality of tape guiding fingers, means mounting said fingers for movement toward and away from each other and, as a group, toward and away from said reels in a plane above said guide drum, motor-driven actuating means including a first reversible electric motor initially disposing said fingers at a starting position close to each other for engaging the tape between the reels and then moving said fingers, as a group while close to each other, from between said reels and then away from each other to form the tape engaged by said fingers into a loop above said drum, which loop falls from said fingers and engages around said drum, guide pins engageable with said loop when the latter falls from said fingers around said drum to direct said loop in a helical path on said drum, whereby said head means scans skew tracks on the tape, tape drive means engageable with the tape upon the engagement of the latter with said guide drum, means operable to strip the tape from said drum and from said guide pins for permitting rewinding of the tape loop onto one of said reels, means for driving said take-up reel, head means and tape drive means including a second electric motor, and circuit means for controlling said first and second motors including first switch means actuable to initiate operation of said first motor in one direction for causing said fingers to move away from said starting position and to form said loop and guide the latter into contact with said drum, second switch means actuated upon the falling of the loop from said fingers and acting to reverse the direction of operation of said first motor for returning said fingers to said starting position and to initiate operation of said second motor, third switch means actuated upon the return of said fingers to said starting position to halt operation of said first motor, and fourth switch means actuable upon operation of said means to stip the tape from said drum and guide pins for halting operation of said second motor.

13. In a magnetic recording and/or reproducing apparatus, the combination according to claim 12, in which said circuit means further includes means operative upon the actuation of said fourth switch means to delay the cessation of operation of said second motor to permit the rewinding of the tape loop onto said take-up reel.

14. In an apparatus for magnetically recording and/or reproducing signals on a tape wound on reels disposed in a cassette having an opening across which the tape extends between the reels, the combination of a chassis, a cassette holder open at the front to slidably receive said cassette and being tiltably mounted on said chassis to pivot between an inclined position, at which said front of the holder is elevated for convenient reception of the cassette, and an operative horizontal position, rotary magnetic head means for recording and/or reproducing signals on said tape and being movable in a circular path spaced from said reels, a tape guide drum having its periphery coinciding with said circular path to guide the tape during said recording and/or reproducing by said head means, a plurality of fingers, means mounting said fingers for movement toward and away from each other and, as a group, toward and away from said holder, actuating means initially disposing said fingers at a starting position close to each other for projecting into said opening of the cassette to engage the tape extending thereacross, and then moving said fingers, as a group while close together, from said opening toward said drum and then away from each other in arcuate paths in a plane above said drum for forming a loop in the tape withdrawn from said cassette and releasing said loop to fall from said fingers around said drum, and said means mounting said fingers including a tiltable support plate pivoted on said chassis in back of said cassette holder and means connecting said cassette holder with said support plate so that the latter is elevated when said holder is in said inclined position for preventing interference by said fingers with the insertion of a cassette in said holder and said support plate is depressed in response to movement of said holder to its operative horizontal position so as to project said fingers downwardly into said opening of the cassette when in said starting position.

15. In a magnetic recording and/or reproducing apparatus comprising a chassis, means on said chassis to rotatably support take-up and supply reels having a magnetic tape wound on said reels and extending between the latter, rotary magnetic head means for recording and/or reproducing signals on said tape and being movable in a circular path spaced from said reels, a tape guide drum having its periphery coinciding with said circular path to guide the tape during said recording and/or reproducing by said head means, tape guiding means engageable with said tape between the reels and being actuable to form a loop of tape above said drum from tape withdrawn from the reels and to release the tape loop so that the latter falls around said guide drum, and motor driven actuating means for automatically actuating said tape guiding means; said tape guiding means including a plurality of fingers, a support plate mounted on said chassis, a shaft journalled in said support plate and being rotatable by said motor driven actuating means, a carrier plate fixed on said shaft for rotation therewith, an assembly of arms having said fingers respectively depending therefrom, means pivotally mounting said assembly on said carrier plate at a location on the latter radially spaced from said shaft so that turning of said shaft through a predetermined angle causes movement of the fingers as a group, means pivotally mounting said arms with respect to each other so that relative angular displacements of said arms cause movement of the fingers toward and away from each other, means for maintaining said arms in closely adjacent relationship during turning of said shaft through said predetermined angle, and means to angularly space said arms from each other upon turning of said shaft beyond said predetermined angle.

16. A magnetic recording and/or reproducing apparatus according to claim 15, in which said means pivotally mounting said assembly on said carrier plate includes a pivot pin connecting one of said arms to said carrier plate at said location of the latter, and said means pivotally mounting said arms with respect to each other includes pivot pins respectively connecting the other arms to said one arm.

17. A magnetic recording and/or reproducing apparatus according to claim 16, in which said means to angularly space said arms from each other includes engageable means on said one arm and carrier plate to cause said one arm to turn with said carrier plate beyond said predetermined angle, and abutment means on said one arm and said other arms engageable in succession in response to turning of said one arm with said carrier plate to cause said other arms to follow the turning movement of said one arm at different predetermined angles with respect to the latter.

18. A magnetic recording and/or reproducing apparatus according to claim 17, further comprising yieldable means for resisting turning of said other arms with said one arm and being overcome by the engagement of said abutment means.

* * * * *